Feb. 11, 1964  J. L. CARSWELL  3,121,055
LIQUID LEVEL CONTROL APPARATUS
Filed Aug. 8, 1960

INVENTOR.
JOHN L. CARSWELL
BY
*Irons, Birch, Swindler & McKie*
ATTORNEYS

United States Patent Office 3,121,055
Patented Feb. 11, 1964

3,121,055
LIQUID LEVEL CONTROL APPARATUS
John L. Carswell, Jacksonville, Fla., assignor to Carpco-Kewanee, Inc., Jacksonville, Fla., a corporation of Florida
Filed Aug. 8, 1960, Ser. No. 47,985
13 Claims. (Cl. 204—302)

This invention relates to a liquid flow control apparatus and more particularly to the control of liquid level in such apparatus.

Various liquid flow systems embody a submerged or partially submerged dome into which the liquid is introduced for some purpose such as treatment of the liquid. Typically, liquid treating apparatus is mounted in the gas space enclosed in the top of the dome. The treated liquid flows out from under the bottom of the dome and upwardly around the sides thereof. Frequently, in such systems it is desirable to maintain a substantially constant liquid level in the bottom of the dome.

For example, in some liquid treating processes it is desirable to maintain the liquid flowing from under the dome as quiescent as possible. Consequently it is essential that gas entrapped over the liquid be prevented from bubbling out from under the dome. Unless the liquid level in the dome is carefully controlled, excessive gas pressure build-up in the dome may result in such undesired escape of the gas. Such a pressure build-up can occur for example where the liquid being treated contains dissolved or entrained gases.

It is a general object of the present invention to provide an improved liquid level control apparatus.

It is another object of the present invention to provide an improved liquid flow control apparatus to conduct liquid into a submerged gas-filled dome and then out from under the dome and to maintain the liquid level in the dome within permissible limits.

It is still another object of this invention to provide an improved apparatus for treating liquid in a submerged gas-filled dome wherein the gas over the liquid is prevented from escaping by effectively controlling the liquid level in the dome.

Broadly, the present invention embraces an apparatus for controlling liquid flow which comprises a tank, a first dome having an open bottom mounted in the tank to provide a gas enclosure when the tank contains liquid above the bottom of the dome, flow control means cooperable with the dome to cause liquid to flow thereinto and then out from the bottom thereof, and means to control the level of the liquid in the dome by controlling the liquid level in a second dome having an open bottom and mounted in the tank to provide another gas enclosure in mutual gas communication with the first dome.

While having broader utility, the invention is described particularly in reference to the separation of the phases of an emulsion by passing the emulsion through the dome in the manner described and subjecting it to a corona wind discharge by means of apparatus mounted within the dome. Such an emulsion breaking process and apparatus is described in detail in co-pending application Serial No. 803,287, filed March 31, 1959, now U.S. Patent 3,074,870, which is a continuation-in-part of application Serial No. 727,718, filed April 21, 1958, now abandoned.

The invention having been generally described, a specific embodiment thereof will now be set forth in detail with reference to the accompanying drawing in which.

Figure 1:
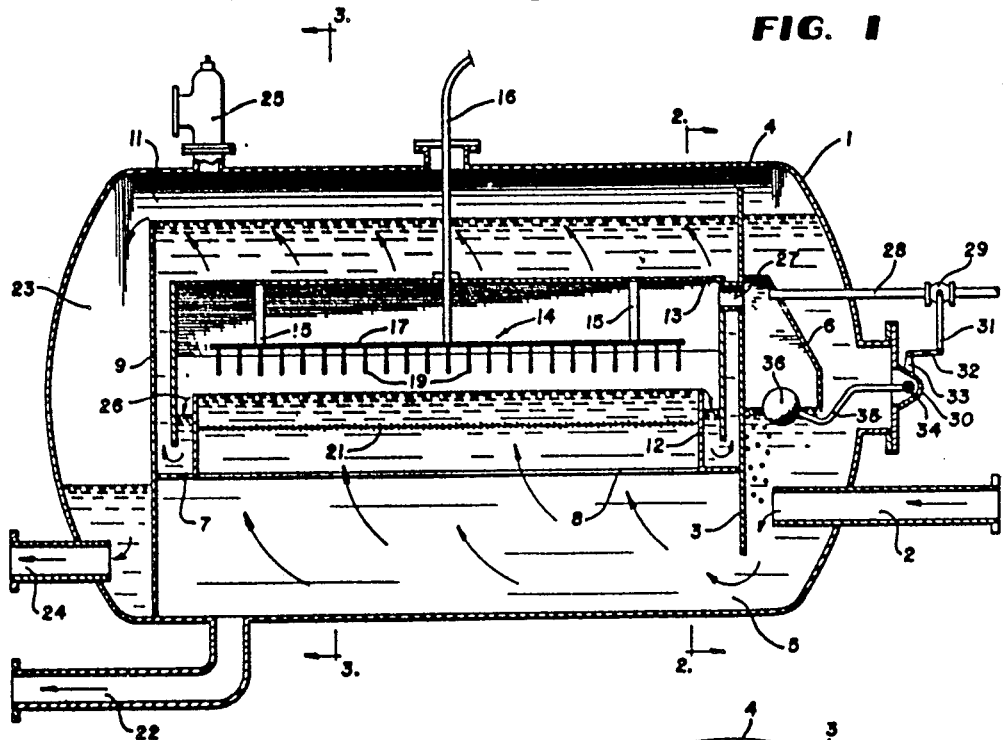
FIGURE 1 is a longitudinal sectional view of a flow control apparatus according to the invention employed in connection with a corona wind emulsion breaking system.
Figure 3:
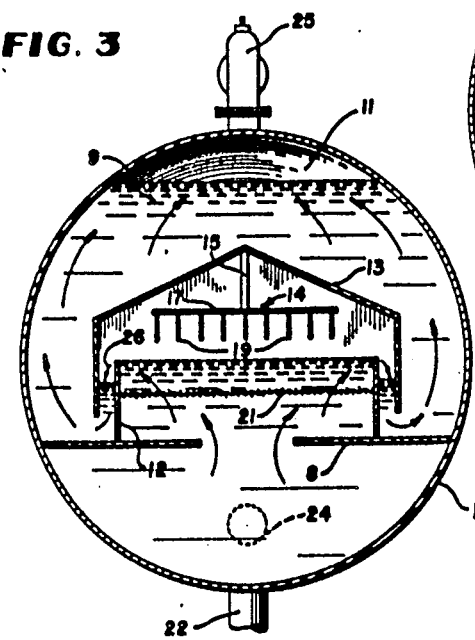
FIGURE 3 is a transverse vertical section taken along the line 3—3 of FIGURE 1.
Figure 2:
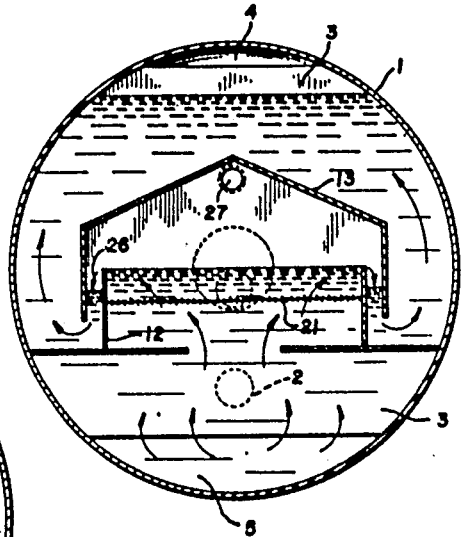
FIGURE 2 is a transverse vertical section taken along the line 2—2 of FIGURE 1.

There is shown in FIGURE 1 a treating tank 1 particularly adapted for the breaking of emulsions which comprise oil as the continuous phase and water as the dispersed phase. The specific emulsion breaking process forms no part of the present invention and will be described only briefly herein. For a more detailed description reference is made to the aforementioned co-pending applications.

The oil-water emulsion is admitted into the tank 1 through an inlet conduit 2 which is situated near the bottom of one end of the tank and extends a short distance into the tank. Mounted transversely across the tank 1, slightly spaced from the inner end of the inlet 2 is a baffle plate 3 which extends completely across the tank to provide a seal except for openings at the top and bottom thereof at 4 and 5. The baffle may be mounted by any suitable means such as welding. Mounted directly above the inner end of the inlet conduit 2 is an auxiliary dome 6, the function of which is discussed in more detail hereinafter. The oil-water emulsion frequently contains entrained gases which are largely released when the emulsion impinges against the baffle 3. The released gases then rise upwardly into the dome 6. The oil-water emulsion flows downwardly around the bottom of the baffle 3 through the opening 5 and then upwardly through a horizontal plate 7 which is slotted at 8. The plate 7 is mounted as by welding between the baffle 3 and another transverse baffle 9 which extends across the outlet end of the tank 1 and is attached thereto by any suitable connection such as welding. The baffle 9 provides a liquid tight seal across the outlet end of the tank 1 thereby defining a liquid containing chamber on the inlet side of the baffle 9. The baffle 9 terminates short of the top of the tank to provide an opening 11 thereabove defining a liquid outlet for the liquid containing chamber.

Mounted on top of the plate 7 is a large conduit 12 through which the oil-water emulsion flows upwardly after passing through the slot 8. Also mounted within the tank is a primary treating dome 13. The domes 6 and 13 may be fixed in position within the tank by any suitable supporting structure, the details of which are not shown since it forms no part of the present invention. The dome 13 has an open bottom which surrounds the upper portion of the conduit 12. The horizontal cross sections of the conduit 12 and dome 13 are generally similar in shape with the conduit 12 mounted concentrically within the dome 13 and spaced slightly therefrom. Thus the conduit 12 fills a substantial portion of the dome 13.

The top edge of conduit 12 forms a weir over which the oil, from which the water has been removed, flows into the space between the conduit 12 and the dome 13.

Mounted within the gas space in the top of the dome 13 is an electrode assembly 14 attached by hangers 15 and having an electrical conduit 16 connected thereto. The conduit 16 extends through fluid tight joints in the tops of the dome 13 and the tank 1 for connection to a suitable source of electricity. The electrode assembly 14 includes a conducting plate 17 from which a plurality of pointed electrodes 19 extend. The axes of the electrodes 19 are substantially normal to the liquid level maintained in the conduit 12 by the weir at the upper edge thereof and are spaced slightly thereabove. Mounted across the conduit 12 at some distance below the weir is a screen 21 of conductive material. The screen 21 is connected electrically to the tank 1 which is grounded. Accordingly, in the conventional manner when a charge is placed upon the electrode assembly 14, a corona wind is discharged toward the grounded screen 21. As fully described in the co-pending applications the effect of the corona wind is to break the oil-water emulsion.

After the emulsion is broken, the water descends through the conduit 12 into the bottom of the tank and is discharged as desired through an outlet conduit 22. The oil overflows across the weir into the space between the conduit 12 and the dome 13 where a trough is formed by the plate 7, the conduit 12, the baffles 3 and 9, and the sides of the tank 1. The oil then flows upwardly around the outside of the dome 13 toward the top of the tank 1. Since the top of the baffle 9 is situated below the top of the baffle 3, the oil overflows across the former into a space 23 outside of the baffle 9 at the outlet end of the tank 1. The oil may then be withdrawn as desired through an oil outlet 24. A back pressure valve 25 is provided to release excess gas from the top of the tank 1 thereby maintaining a substantially constant pressure therein.

It is desirable to maintain the oil flowing upwardly from around the dome 13 as quiescent as possible and thus gas must not be permitted to bubble out from under the dome 13. It is therefore important to maintain the liquid level 26 in the space between the conduit 12 and the dome 13 above the bottom edge of the dome. To that end, the bottom edge of the auxiliary dome 6 is situated above the bottom of the dome 13 and below the top of the conduit 12. Since the domes 6 and 13 are connected in mutual fluid communication by a conduit 27, the pressure in the two domes is equalized. If there is build-up of such pressure, overflow occurs from the higher bottom of the dome 6 and not from the lower bottom of the dome 13. Thus the lowermost liquid level which can occur in the primary dome 13 is at the level of the bottom of the auxiliary dome 6. Consequently, the liquid is effectively prevented from ever overflowing the bottom edge of the dome 13.

In some cases the liquid may dissolve some gas from under the domes 6 and 13. Accordingly, to maintain a constant level in the dome 13, gas must be supplied to replace that which is dissolved. To supply such gas, a pipe 28 extends into the dome 6 and is connected to a suitable source of gas. Inflow of gas through the pipe 28 is controlled by a valve 29. The operation of the valve 29 is controlled by pivoted handle 31 to which is pivotally connected link 32 which in turn is pivotally connected to a lever arm 33. The lever arm 33 is non-rotatably attached to a shaft 34 which is journaled in a cover plate 30 at the inlet end of the tank 1. Non-rotatably attached to the shaft 34 inside of the cover plate 30 is an arm 35 which extends into the tank 1 and has connected to its inner end a float 36 situated within the dome 6. When the gas pressure within the domes 6 and 13 drops due to absorption of gas by the liquid, the liquid level rises, thereby lifting the float 36 which opens the valve 29 through the associated linkage to replenish the gas in the domes. When the pressure in the domes rises sufficiently, the float is again lowered thereby closing the valve 29. The gas supply control is adjusted to maintain sufficient pressure in the domes to keep the liquid level 26 below the top of the weir formed by conduit 12.

In addition to electrical emulsion breaking processes, certain chemical processes are available to break emulsions. If desired, any such chemical process may be combined with the electrical process described by adding the chemicals to the emulsion prior to introduction into the tank 1 through the inlet 2.

It will be understood that the liquid level control system of the present invention is not limited to use with the emulsion breaking apparatus in respect to which it is described herein. The invention may be employed in connection with various liquid treating processes other than emulsion breaking and indeed with any flow system in which it finds utility.

There has been illustrated and described what is considered to be a preferred embodiment of the invention. It will be understood, however, that various modifications may be made by persons skilled in the art without departing from the scope of the invention as defined by the appended claims.

I claim:

1. In an apparatus for controlling liquid flow, the combination comprising a tank defining a chamber for containing liquid to a predetermined level, first and second hollow domes mounted in said tank and having open bottoms extending downwardly into said chamber below said level so that said domes provide gas enclosures when the liquid level is above said dome bottoms, said domes having a gas conducting connection between said enclosures, said first dome being spaced from an interior surface of said chamber to provide a passageway therebetween, means to introduce liquid into said first dome thereby forcing liquid out from the bottom of said first dome, and means to control the liquid level in said second dome thereby controlling the liquid level in said first dome.

2. An apparatus as recited in claim 1 wherein the bottom of said second dome is positioned at an elevation above the bottom of said first dome to prevent the liquid level in said first dome from falling below said elevation.

3. An apparatus as recited in claim 1 wherein said tank comprises a closed vessel to permit pressurization thereof, said tank having a wall extending across the interior thereof to define one end of said chamber, said wall having an upper portion defining a liquid outlet.

4. An apparatus as recited in claim 2 wherein said liquid introducing means includes a conduit extending upwardly into the bottom of said first dome and slightly spaced therefrom around the entire circumference thereof, the top of said conduit forming a weir over which the liquid flows at a level above said elevation.

5. An apparatus as recited in claim 4 further comprising means to supply gas to said domes to maintain the liquid level in said first dome below said weir.

6. In a liquid treating apparatus, the combination comprising a tank defining a chamber for containing liquid to a predetermined level, first and second hollow domes mounted in said tank and having open bottoms extending downwardly into said chamber below said level so that said domes provide gas enclosures when said tank contains liquid above the bottoms of said domes, said domes having their upper portions connected in mutual gas communication, said first dome being spaced from an interior surface of said chamber to provide a passageway therebetween, flow control means cooperable with said domes to cause liquid to flow into said first dome and then out from the bottom thereof, said flow control means including a conduit extending upwardly into the bottom of said first dome, said conduit being slightly smaller than and spaced from an interior surface of said first dome, the top of said conduit forming a weir spaced above the bottom of said first dome, and means mounted in said first dome to treat the liquid flowing out of said conduit, the bottom of said second dome being positioned at an elevation between the bottom of said first dome and said weir to prevent the liquid in said first dome from falling below said elevation.

7. In a liquid treating apparatus, the combination comprising a tank defining a chamber for containing liquid to a predetermined level, first and second hollow domes mounted in said tank and having open bottoms extending downwardly into said chamber below said level so that said domes provide gas enclosures when said tank contains liquid above the bottoms of said domes, said domes having their upper portions connected in mutual gas communication, said first dome being spaced from an interior surface of said chamber to provide a passageway therebetween, flow control means cooperable with said domes to cause liquid to flow into said first dome then out from the bottom thereof, said flow control means including a conduit extending upwardly into the bottom of said first dome, said conduit being slightly smaller than and spaced from an interior surface of said first dome, the top of said conduit forming a weir spaced above the bottom of said first dome, means mounted in said first dome to treat the liquid flowing out of said conduit, the bottom of said second dome being positioned at an elevation between the bottom of said first dome and said weir to prevent the liquid in said first dome from falling below said elevation, and means to supply gas to said domes to maintain sufficient pressure therein to keep the liquid level in said first dome below said weir.

8. In a liquid apparatus, the combination comprising a tank, first and second transverse baffles mounted across said tank at longitudinally spaced locations, a liquid inlet at one end of said tank outside of said first baffle, said first baffle providing a liquid opening in the lower portion of said tank to force liquid from said inlet to pass through said opening, said first baffle providing a gas opening in the upper portion of said tank, said second baffle closing the lower portion of said tank to define a chamber for containing liquid to a predetermined level, said second baffle providing an opening in the upper portion of said chamber below said gas opening, an auxiliary hollow dome mounted in said tank outside of said first baffle and having an opening bottom extending below said level to provide a gas enclosure overlying said inlet, a primary hollow dome mounted between said baffles and having an open bottom spaced below the bottom of said auxiliary dome to provide another gas enclosure, said primary dome being spaced from an interior surface of said chamber to provide a passageway therebetween, said domes having their upper portions connected in mutual gas communication, liquid treating means mounted in the upper portion of said primary dome, a conduit extending upwardly into the bottom of said primary dome to conduct liquid from said liquid opening into said primary dome for treatment, said conduit being spaced from an interior surface of said primary dome and filling a substantial portion of the cross section thereof, the top of said conduit providing a weir spaced above the bottom of said auxiliary dome, said liquid being conducted after treatment upwardly outside of said primary dome through said passageway and through the opening in said second baffle, and means to withdraw liquid from said tank outside of said second baffle.

9. An apparatus as recited in claim 8 further comprising means to supply gas to said domes to maintain the liquid level in said first dome below said weir.

10. An apparatus as recited in claim 9 wherein said gas supply means comprises a pipe connected to said auxiliary dome and a valve in said pipe controlled by a float mounted in said auxiliary dome.

11. An apparatus as recited in claim 6 wherein said tank comprises a closed vessel to permit pressurization thereof, said tank having a wall extending across the interior thereof to define one end of said chamber, said wall having an upper portion defining a liquid outlet, and said liquid treating means comprises electrical means to direct a corona wind onto the surface of the liquid.

12. An apparatus as recited in claim 7 wherein said tank comprises a closed vessel to permit pressurization thereof, said tank having a wall extending across the interior thereof to define one end of said chamber, said wall having an upper portion defining a liquid outlet, and said liquid treating means comprises electrical means to direct a corona wind onto the surface of the liquid.

13. A liquid treating apparatus according to claim 8 wherein said tank comprises a closed vessel to permit pressurization thereof and said treating means comprises electrical means to direct a corona wind onto the surface of the liquid.

References Cited in the file of this patent
UNITED STATES PATENTS

| | | |
|---|---|---|
| 1,838,850 | Lawrason | Dec. 29, 1931 |
| 1,932,715 | Van Loenen | Oct. 31, 1933 |
| 2,041,954 | Prutzman | May 26, 1936 |
| 2,042,383 | Bird | May 26, 1936 |
| 2,147,977 | Kalle | Feb. 21, 1939 |
| 2,209,798 | Subkow | July 30, 1940 |
| 2,604,108 | Considine | July 22, 1952 |
| 2,667,646 | Monteiro | Feb. 2, 1954 |